United States Patent [19]

Rahman et al.

[11] 4,038,438

[45] July 26, 1977

[54] METHOD OF COLORING SYNTHETIC FOOD CASINGS

[75] Inventors: Matiur Rahman, Champaign; Harold R. Coleman, Danville, both of Ill.

[73] Assignee: Tee-pak, Inc., Chicago, Ill.

[21] Appl. No.: 706,854

[22] Filed: July 19, 1976

[51] Int. Cl.² .................. A22C 13/00; A23L 1/27; B05D 3/02
[52] U.S. Cl. .................. 427/385 R; 426/250; 426/277; 426/278; 427/386; 427/389; 427/390 R
[58] Field of Search .................. 426/290, 277, 278; 427/386, 390 R, 385 R, 389, 394

[56] References Cited

U.S. PATENT DOCUMENTS

| | | | |
|---|---|---|---|
| 3,539,361 | 11/1970 | Coleman | 427/386 X |
| 3,917,894 | 11/1975 | Coleman | 427/386 X |
| 3,943,262 | 3/1976 | Winkler et al. | 426/250 |
| 3,961,085 | 6/1976 | Winkler et al. | 426/250 X |

*Primary Examiner*—James R. Hoffman
*Attorney, Agent, or Firm*—Paul Shapiro; Joseph E. Kerwin; William A. Dittmann

[57] ABSTRACT

A method for coloring synthetic food casings such as casings manufactured from cellulose and collagen wherein the tubular casing in the gel state is impregnated with a solution containing caramel and thereafter the caramel is cross-linked and insolubilized in the casing to effect permanent coloring of the casing.

5 Claims, No Drawings

METHOD OF COLORING SYNTHETIC FOOD CASINGS

BACKGROUND OF THE INVENTION

1. Field of the Invention

This invention relates to a method of coloring tubular food casings and more particularly to a method of imparting a natural color to cellulose and collagen casings.

2. The Prior Art

Tubular food casings for edible products such as weiners, sausages, bolognas, and the like, are presently manufactured, on a commercial basis, from regenerated cellulose and collagen. These casings generally are made from aqueous solutions of the base materials, extruded in a coagulation bath, formed into a tube, then inflated with air and passed through a dryer. These tubular films, in the gel state, before drying, generally contain a substantial proportion of water, e.g., about 65% by weight for a regenerated cellulose casing and about 91% by weight for tanned collagen casings.

Cellulose casings are normally prepared by extruding a viscose solution through an annular die into a coagulating bath to produce a hollow, thin-walled tube of coagulated and partially regenerated cellulose. The tube is subsequently treated in an acid bath to thoroughly regenerate the cellulose and washed to remove by-products. The regenerated cellulose tube in the gel state is treated with an aqueous solution of a plasticizer such as glycerine to effect softening thereof and then dried in a dryer at a temperature of about 80°–125° C while inflated under an air pressure of about 6 psi for 3 to 10 minutes. After drying, the casing is wound on reels and subsequently shirred on high speed shirring machines.

Cellulose casings having a fibrous reinforcement are prepared wherein a tube of fibrous paper, preferably a long fiber hemp paper, is formed and passed adjacent to the annular orifice of the extrusion die so that the paper tube is impregnated and coated with viscose. The impregnated and coated tube is passed through a coagulating and regenerating bath to produce regenerated cellulose within the fibrous paper and on the surface of the paper as a substantial coating. The final product, known in the trade as fibrous casing, consists of about 35–40% fibrous paper and about 60–65% regenerated cellulose and softening components. The fibrous paper after regeneration of the viscose is washed to remove impurities and then dried in a manner similar to that described for the unreinforced or clear casing.

In the manufacture of collagen casings, a collagen source, typically animal hide collagen, is converted into a finely divided fibrillar form, swelled in water at a pH between 2.5 and 3.7 and extruded in the form of a dilute (2–6% by weight) collagen slurry through a die to form a tubular casing. The extruded collagen is passed into a coagulation bath which dehydrates the collagen slurry into a gel-like collagen casing. The coagulating bath typically contains a salt such as sodium sulfate or ammonium sulfate in large concentration (e.g. 40% by weight) and a small amount of alkali, e.g., sodium hydroxide or ammonia, for neutralizing excess acid which may be present in the collagen casing. The collagen casing, then, is hardened or tanned to form a more coherent structure and permit further processing of the casing, i.e., to provide sufficient strength so that it can be threaded and inflated during drying. Often, a two-step tanning process is employed, with the first tanning step being effected by an aluminum tanning agent, e.g., an aluminum citrate complex, and the second tanning step being effected by reaction with a dialdehyde, e.g., glutraldehyde. After removal from the tanning bath, the casing is passed through a bath containing a plasticizing agent. The casing removed from the plasticizing bath is in a gel state and contains a substantial amount of water, e.g., 90 to 91% by weight. In order that the casing be used as a sausage casing the plasticized casing is inflated with air at about 0.05 psi and dried in a drier at a temperature of about 65°–90° C for 2 to 10 minutes to reduce the moisture content to about 14% by weight.

Synthetic food casings derived from cellulose and collagen are frequently colored for esthetic effects. The color frequently desired is a transparent light brown color to imitate the color frequently observed on "natural" casings prepared from the intestines of butchered animals.

In cellulosic casings the natural color is frequently imparted to the casing by injecting a concentrated blood solution (of slaughtered animals) into viscose before extrusion. The blood coloring components become entrapped in the casing substrate during coagulation of the viscose which results in a permanent coloring of the casing.

Coloring cellulosic casings with blood presents several problems including special handling of the colorant due to its animal derivation, variation in the colorant from blood components derived from different animal sources, and plugging of extrusion dies due to insoluble materials which may be present in the blood.

A natural color is imparted to collagen casings using various combinations of water soluble food colors such as Orange B and Blue I which are respectively sulfonated arylazo and sulfonated triarylmethane type dyes. A problem encountered with these colorants is the extractibility of these colors when the casing is rewetted or otherwise brought into contact with water which causes unacceptable discoloration of the encased meat product.

SUMMARY OF THE INVENTION

In accordance with the present invention there is provided a method for permanently coloring synthetic food casings which avoids the problems of the prior art enumerated above wherein the tubular casing while in the gel state and prior to drying is contacted with solution containing caramel for a time sufficient to impart a desired level of color to the casing and then cross-linking the caramel to insolubilize the caramel impregnated in the casing whereby permanent coloring of the casing is effected.

In addition to effecting permanent natural coloring of cellulose and collagen casings, the coloration of collagen casings by the method of present invention, as will hereinafter be illustrated, also improves the strength characteristics of the casing.

PREFERRED EMBODIMENTS

Caramel which is used as a colorant in the practice of the present invention is a well known and staple commercial material. It has long been used for imparting a dark brown color to numerous food products, especially liquids such as soft drinks and certain alcoholic spirits. It is known to the art, e.g., U.S. Pat. Nos. 3,622,343 and 3,733,405, that caramel is an amorphous, dark brown, deliquesent powder or a thick liquid having a bitter taste, a burnt sugar odor and a specific gravity of approximately 1.35. It is soluble in water and dilute alcohol. Caramel is prepared by the careful, controlled heat treatment of carbohydrate or saccharide materials such as dextrose, invert sugar, lactose, malt syrup, molasses, sucrose, starch hydrolysates and fractions thereof. Other materials which may be employed during heat treatment to assist caramelization include acids (e.g. acetic aicd, citric acid, phosphoric acid, sulfuric acid and sulfurous acid); and salts (e.g. ammonium, sodium or potassium carbonates, bicarbonates, dibasic phosphates or monobasic phosphates).

In one process of manufacturing caramel described in U.S. Pat. No. 3,733,405, a liquid sugar, either cane or corn is pumped into a reactor vessel along with one or a combination of the reagents authorized by the U.S. Food and Drug Administration and the mixture is heated. Temperatures ranging from 250° to 500° F are maintained and the product is held been 15 and 250 pounds per square inch pressure (psi) while the polymerization takes place. When processing is completed the product is discharged to a flash cooler which drops the temperature to 150° F. It is then filtered, cooled and pumped to storage.

A commercially available powdered caramel which has been found effective in the practice of the present invention is available from the S. Twitchell Company and designated as Caramel Color T-717. This caramel product is described by the manufacturer as a dehydrated, hygroscopic, powdered food color made entirely from corn syrup greens by heating under controlled conditions and has the same characteristics as liquid caramel color except that the water has been removed. Caramel Color T-717 has the following specifications:

Moisture—3.50% max.
Insoluble Material —0.50% max.
pH in 50% Solution—3.16 + 0.3
and contains
Sodium—1580 ppm
Potassium—108 ppm
Carbohydrates—76.65%
Ash—0.70%

To color synthetic food casings by the practice of the present invention, the extruded tubular casing while still in the gel state is passed through a solution containing caramel to impregnate the casing with the caramel which is thereafter cross-linked to insolubilize the caramel colorant in the casing body.

The step of impregnating the extruded tubular casing in the gel state is most conveniently performed immediately before the gel casing is passed to the dryer.

In both of the procedures described above for the manufacture of cellulose and collagen casings, the final step in the preparation of the casing, prior to drying, involves passing the casing through a plasticizing bath. The plasticizing bath is generally an aqueous solution containing a sufficient amount (e.g. about 1 to 15% by weight) of glycerol or eqivalent plasticizer such as sorbitol, propylene glycol or triethylene glycol to plasticize the casing.

To accomplish impregnation of the tubular casing in the gel state with the caramel colorant, the colorant is either added to the plasticizing bath or alternatively, the casing after passing through the plasticizing bath, is further contacted with a separate bath containing the caramel colorant.

Whether caramel impregnation is accomplished in the plasticizing bath or in a second separate bath, impregnation is accomplished by passing the casing, while still in the gel state through a bath containing an amount of caramel sufficient to effect the color level desired in the dried casing product. Depending upon the deepness of shade desired and the composition of the casing, the amount of caramel incorporated in the bath will range from about 0.10 to about 3.0% by weight. For example, to impart a natural color to cellulose casings, about 0.50 to 1.00% by weight of caramel is incoporated in the bath and for collagen casings a natural color is achieved at a caramel concentration in the bath of about 0.3 to about 0.6% by weight.

If caramel impregnation of the casing is to be accomplished in the second bath, i.e., a bath separate from the plasticizing bath, to insure that passage of the plasticized casing through the caramel bath does not extract plasticizer contained in the already plasticized casing, it is preferred that the plasticizer compound be also incorporated in the caramel bath at substantially the same concentration used in the plasticizing bath, e.g., about 3% by weight glycerol for collagen casings and about 13% by weight glycerol for cellulose casings.

After impregnation of the casing, the caramel is insolubilized by cross-linking the caramel within the casing walls.

Cross-linking of caramel impregnated in collagen casings is effected during drying of the casing. It has been determined that caramel contains sufficient aldehydic and other similar functional groups that under the temperatures e.g. 65°–90° C normally used for drying collagen casings, the caramel is caused to react with and be cross-linked by amino or other reactive groups present in the collagen composition of the casing. It has been thus determined that caramel impregnated in collagen casings in accordance with the practice of the present invention and subjected to the temperatures and conditions normally employed for drying collagen tubing in the gel state will be cross-linked and insolublized, thereby imparting permanent, non-extractable coloring to the casing.

It is within the scope of the present invention, that the colorant solution containing the caramel may selectively contain a thermosetting resin to promote cross-linking of caramel when that casing substrate does not contain reactive groups that will react with or cross-link the caramel. Thus, the present invention includes within its scope incorporating in the caramel solution used to color the casing, 0 to 50% by weight of a thermosetting resin that will react with and cross-link the caramel to effect insolubilization in the casing. For example, casings manufactured from cellulose do not contain reactive groups that will effect cross-linking of caramel. To promote cross-linking of the caramel in cellulose casings, a water dispersible cationic thermosetting resin is incorporated in the bath containing the caramel. Examples of suitable water dispersible cationic thermosetting resins include water dispersible cationic melamine-formaldehyde resins and particularly modified melamine-formaldehyde resins such as those described in U.S. Pat. No. 2,796,362, modified urea-formaldehyde resins as for example described in U.S. Pat. No. 2,616,874, and higher polyalkyleneimines such as polyethyleneimine. Water dispersible cationic thermosetting resins which are preferred in the practice of the present invention for insolubilizing caramel are polymeric polyepoxides which are the reaction product of epichlorohydrin and a polyamide as, for example, described in U.S. Pat. Nos. 2,926,154 and 3,695,904. Polymeric polyepoxides which are the reaction product of epichlorohydrin and a polyamide are available commercially from Hercules Inc. and are designated Resin 4190 and Kymene 557. Both Resin 4190 and Kymene 557 are comprised of the reaction product of epichlorohydrin and polyamide prepared by reacting adipic acid with diethylenetriamine.

To effect insolubilization of the caramel impregnated in cellulose casings the thermosetting resin is added to the bath containing the caramel at a concentration ranging from about 0.5 to about 2.0% by weight and about 0.50 to about 1.50% by weight is preferred.

After the cellulose casing in the gel state has been impregnated with the caramel colorant and the water dispersible cationic thermosetting resin, the casing is subjected as in the case of collagen casings, to drying conditions normally employed for drying cellulose casings to effect cross-linking. The conditions, e.g. heating at temperatures of 95°-115° C for 3 to 10 minutes employed for drying of gel state cellulose casings is effective to cause the thermosetting resins to react with and cross-link and insolubilize the water soluble caramel colorant.

Having generally described the invention, the following Examples are included for purposes of illustration so that the invention may be more readily understood and are in no way intended to limit the scope of the invention unless otherwise specifically indicated. All amounts are on a weight basis unless otherwise specified.

EXAMPLE 1

An aqueous slurry adjusted to a pH of 2.8 with lactic acid and containing about 5% collagen derived from limed hide splits was pumped under pressure through an extrusion die into an aqueous coagulation bath containing sufficient (NH$_4$)$_2$SO$_4$ to saturate the bath. After the casings were coagulated, the wet casings were removed from the coagulation bath and hardened by passing the casings into a tanning bath containing citrate complexed alum. After contact with the tanning bath, the hardened casings were removed and plasticized by immersing the casing in an aqueous bath containing 3% glycerol for about 3 minutes. The plasticized casing was passed into a second bath consisting of 20 grams of Caramel Color T-717, 120 grams of glycerol and adjusted to a volume of 4 liters with deionized water. The dwell time of the casing in the second bath was 10 seconds. The casing was removed from the second bath and excess bath solution was removed by pulling the casing through 3 parallel glass rods. The casing was then inflated and dried at 105° C for 3 minutes.

The dried casing was light tan in color. The color of the casing was not removed when the casings were rewetted by soaking in water for 20 minutes at 70° C.

For purposes of comparison, the procedure of Example 1 was repeated with the exception that no caramel colorant was incorporated in the second bath. The comparative casing produced in this manner was white in color.

The casing produced in Example 1 as well as the comparative casing were evaluated for strength characteristics. The strength characteristics were determined using an Instron tester which measured the energy or force required to break the casing. The tester was run at 2 inch/minute cross-head and 5 inch/minute chart speeds using single wall casing strips 0.5 inch wide. Two sets of energy data were determined, i.e. the break energy of the rewet casing and the break energy of the conditioned casing. A rewet casing is the casing taken from the dryer and immersed in water. A rewet break energy gives an approximation of the casings resistance to breakage during stuffing operations. A conditioned casing is obtained by maintaining a casing in a room at 70° F and 55% relative humidity for a 24 hour period prior to testing. The break energy of the conditioned casing gives an approximation of the casing's dry strength under a standard set of temperature and humidity and is used for comparison purposes of different casings.

The break energy data for the rewet and conditioned casing prepared in accordance with the procedure of Example 1 as well as the comparative casing are summarized and recorded in the Table below.

TABLE

| | BREAK ENERGY | |
|---|---|---|
| | Casing of Example 1 | Comparative Casing |
| Conditioned | | |
| Longitudinal Energy | 1.92 in/lb. | 1.56 in/lb. |
| Transverse Energy | 1.80 in/lb. | 1.64 in/lb. |
| Rewet | | |
| Longitudinal Energy | 6.52 in/lb. | 6.32 in/lb. |
| Transverse Energy | 6.16 in/lb. | 4.96 in/lb. |

By reference to the Table, it is immediately apparent that collagen casings modified with cross-linked caramel in accordance with the method of the present invention exhibit increased resistance to breakage especially when compared to collagen casings which have not been treated with caramel.

EXAMPLE II

Cellulosic casings were prepared by extruding viscose through a die having an annular orifice into a regenerating and coagulating bath containing ammonium sulfate, sodium sulfate and sulfuric acid. The casing was then washed to remove acids, salts and by-products and passed through a plasticizing bath containing 13% glycerol. The plasticized casing was then immersed for one minute in an aqueous solution composed of 1% Caramel Color T-717, 1% Resin 4190, 13% glycerol and 85% water. The excess solution was removed by passing the casing between 2 parallel rods. The casing was then inflated, placed in a circulating warm air oven at 100° C for 5 minutes to effect cross-linking and insolubilization of the caramel imbibed by the casing. The resulting casing had a light brown transparent color.

A section of the cross-linked, caramel colored casing was soaked in a beaker of hot water for 30 minutes. The color in the casing remained light brown. No discoloration of the soak water could be observed.

For purposes of comparison, the procedure of Example II was repeated except that Resin 4190 was omitted from the caramel bath. The resulting casing was considerably lighter in color when compared to the casing colored in Example II. Soaking the comparative casing in hot water discolored the soak water due to extraction of the caramel color.

What is claimed is:

1. In the process for the manufacture of synthetic food casing wherein a tubular casing is formed in the gel state and subsequently dried, the improvement which comprises impregnating the tubular casing, while in the gel state and prior to drying, with a colorant solution containing about 0.10 to about 3.0% by weight caramel and 0 to 5% by weight of a water dispersible cationic thermosetting resin for reaction with the caramel and then drying the casing to effect cross-linking and insolubilization of the caramel whereby permanent coloration is imparted to the casing.

2. The process of claim 1 wherein the casing is formed from regenerated cellulose and the colorant solution contains about 0.5 to about 2.0% by weight caramel and about 0.5 to about 2.0% by weight of the thermosetting resin.

3. The process of claim 1 wherein the thermosetting resin is a polymeric polyepoxide reaction product of epichlorohydrin and a polyamide.

4. The process of claim 3 wherein the polyamide is the reaction product of adipic acid and diethylenetriamine.

5. The process of claim 1 wherein the casing is formed from collagen and the colorant solution contains about 0.3 to about 0.6% by weight caramel.

* * * * *